Jan. 9, 1968  J. W. SCHLIRF  3,362,626

METHOD OF AND APPARATUS FOR CONTROLLING GAS FLOW

Filed Nov. 15, 1965

*INVENTOR.*
JOHN  W.  SCHLIRF.

BY

ATTORNEY.

3,362,626
METHOD OF AND APPARATUS FOR
CONTROLLING GAS FLOW
John W. Schlirf, Jeannette, Pa., assignor to Carrier Corporation, Syracuse, N.Y., a corporation of Delaware
Filed Nov. 15, 1965, Ser. No. 507,864
6 Claims. (Cl. 230—115)

ABSTRACT OF THE DISCLOSURE

A control system for turbine driven compressors which utilizes compressor discharge pressure to regulate turbine input and utilizes a combination of regulated turbine input pressure and pressures indicative of compressor discharge flow rate to control the compressed gas dump valve to prevent compressor surge.

This invention relates to turbine driven gas compressors. More particularly, this invention relates to a control system for steam turbine driven gas compressors. Still more particularly, this invention relates to a control system to prevent compressor surge in a compressor supplying gas in response to a variable gas flow demand.

In many installations, a variable supply of gas such as air is required. At certain high pressure, low flow conditions, the compressor supplying the gas is subject to a condition known as surging. Under these conditions, the gas flow through the compressor becomes unstable and oscillates, causing a large pressure drop.

To avoid surge when there is a low flow demand, complicated and expensive controls are employed to reduce the sped of the compressor and/or to dump sufficient air from the discharge side of the system to maintain stable gas flow through the compressor.

It is therefore an object of this invention to provide a simplified control system for a turbine driven gas compressor.

It is a further object of this invention to provide a control system for a turbine driven gas compressor that will maintain stable flow through the compressor.

It is another object of this invention to provide a method for preventing compressor surge in a turbine driven gas compressor.

The objects of this invention are obtained by providing a turbine driven compressor to supply compressed gas to a system requiring a variable supply of gas. A valve, operable in response to system pressure, is utilized to regulate the flow of motive fluid to the driving turbine thereby maintaining constant compressor discharge pressure. A system dump valve in the compressor output line is operable in response to the regulated motive fluid flow between the aforementioned valve and the turbine to dump compressed gas from the system at low flow, high pressure conditions to prevent compressor instability, better known as surge. An exhaust valve, operable in response to the pressure differential across a restrictive orifice in the compressor output line, is employed in a control line to assure system dump proportional to system gas flow. Thus the system dump valve is operable in response to a variable combination of system gas flow and pressure to dump sufficient gas from the system to maintain stable flow through the compressor and constant discharge pressure from the compressor.

Other objects and features of this invention will be apparent from a consideration of the following specification and drawing in which.

Figure 1:
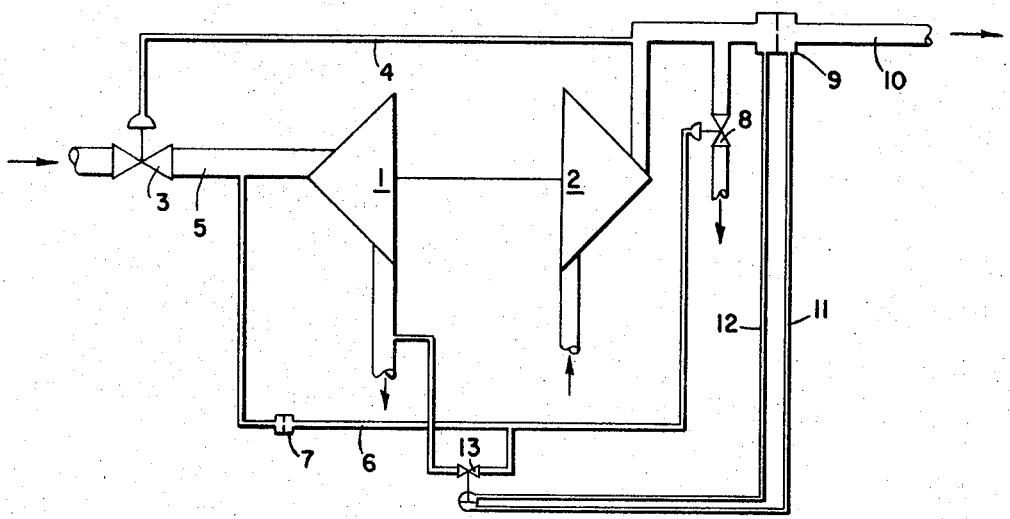
FIGURE 1 is a schematic diagram of the control system forming the subject of this invention.
Figure 2:
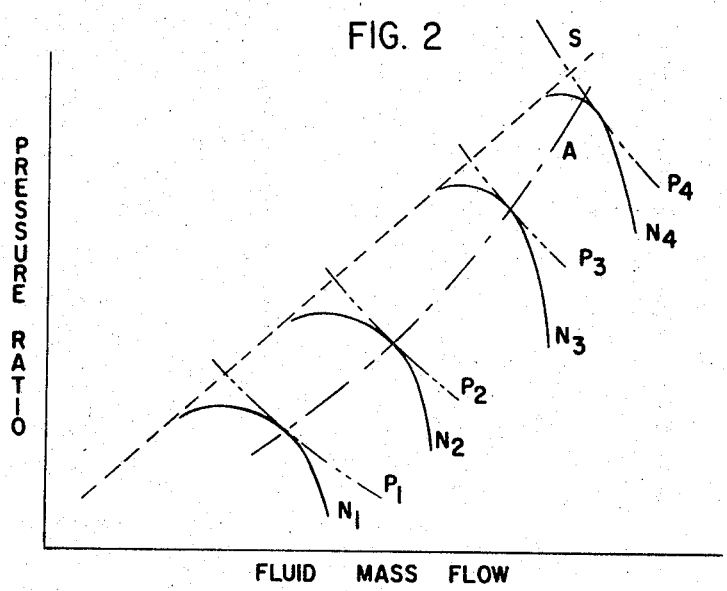
FIGURE 2 is a graphical illustration of the compression ratio plotted against mass flow of gas for different corrected speeds of a generalized rotary compressor.

Referring more particularly to the drawing, the well-known characteristics of a rotary compressor are shown by the hypothetical diagram of FIGURE 2. In a rotary compressor, the operating points (characteristics) determined by plotting mass flow against compression ratio for any given corrected compressor speed will give a curve such as illustrated by $N_1$ or $N_2$ etc., corrected speed being the true rotational speed divided by the square root of the ratio of the true absolute temperature of the fluid at inlet to a standard absolute temperature such as 288° K. Thus it can be seen that at a given corrected speed, the compression ratio and mass flow are related. It can be seen from the diagram that at a given corrected speed, if mass flow is increased beyond a certain point, pressure ratio will drop. Conversely, if mass flow is decreased beyond a certain point, pressure ratio will also drop. If mass flow decreases beyond a certain point, surge will occur. A plot of surge points is shown by the line S. Thus it can be seen that by maintaining the relationship of mass flow and pressure ratio along an optimized line as illustrated by A, surge will be avoided and pressure ratio will be optimized for any given corrected turbine speed.

The control system illustrates a mechanism to provide optimum compressor performance. The drawing shows a steam turbine 1, driving an air compressor 2. A steam valve 3, operable in response to the system air pressure in line 4, controls the quantity of steam delivered to the turbine through line 5 to maintain constant compressor discharge pressure. Control line 6, having restrictive orifice 7 therein, supplies steam from line 5 to system dump valve 8 to maintain the system dump valve closed. Restrictive orifice 9 in system supply or compressor discharge line 10 provides a pressure differential in control lines 11 and 12, proportional to the flow rate across the orifice. This pressure differential in lines 11 and 12 controls exhaust valve 13 in steam line 6 to further control steam pressure at system dump valve 8 by bleeding pressure therefrom. Thus the system dump valve 8 is operable in response to a combination of two variables; system gas flow, which controls exhaust valve 13, and system pressure, through the interaction of steam valve 3 and orifice 7.

Considering the operation of this control system, at high flow rates and low pressure, steam valve 3 is fully open, causing turbine 1 to operate at full power, maintaining high pressure in line 6 to hold dump valve 8 closed. The high flow rate across orifice 9 creates a large pressure differential between lines 11 and 12 which causes exhaust valve 13 to remain closed, and thus help maintain high pressure in steam line 6.

As system pressure increases and flow rate decreases as is the case when the demand on the system is reduced, steam valve 3 will restrict flow of steam to the turbine, reducing pressure in lines 5 and 6, allowing system dump valve 8 to open slightly. The ensuing reduced flow across orifice 9 produces a lower pressure differential between lines 11 and 12, causing exhaust valve 13 to open which lowers pressure in line 6 to further open system dump valve 8. It can be seen that various combinations of flow and pressure open system dump valve 8 to maintain system flow within an optimized range such as illustrated by line "A" of FIGURE 2 which is within the stable operating range of the compressor.

While I have described a preferred embodiment of my invention, it is to be understood that the invention is not limited thereto but may be otherwise embodied within the scope of the following claims.

I claim:
1. A control system for a turbine driven compressor supplying gas to a system comprising, a system dump valve communicating with the compressor discharge and operable in response to fluid pressure to dump a sufficient amount of compressed gas to maintain the compressor within its stable operating range, pressure sensing means, operable in response to turbine input pressure to vary the fluid pressure at said system dump valve, and flow sensing means operable in response to compressor output flow rate to vary the fluid pressure at said system dump valve.

2. A control system for a turbine driven compressor according to claim 1 further including, a valve, operable in response to compressor output pressure to regulate the flow of motive fluid to the turbine, said pressure sensing means including a control line in communication with said dump valve for receiving regulated motive fluid, high pressure motive fluid maintaining said dump valve closed, low pressure motive fluid allowing said system dump valve to open, and, a restrictive orifice in said control line to restrict flow of motive fluid to said system dump valve.

3. A control system for a turbine driven compressor according to claim 2 wherein said flow sensing means comprises, a restrictive orifice in the compressor output line, a gas line communicating with said compressor output line at each side of said orifice to measure the pressure drop across the orifice which is proportional to flow through the orifice.

an exhaust valve operable in response to a predetermined pressure differential in said gas lines, said exhaust valve being position in said control line downstream from said control line orifice to dump motive fluid from said control line under conditions of low flow compressor output and thereby vary the opening of said system dump valve.

4. A method for preventing compressor surge in a turbine driven compressor providing a variable supply of compressed gas to a system, comprising the steps of, regulating the flow of motive fluid to the turbine in response to compressor output pressure, utilizing a portion of the regulated motive fluid to actuate a system dump valve for dumping excess gas from said system, selectively exhausting the regulated motive fluid actuating said system dump valve in response to compressor output flow to provide control of said system dump valve by the combined action of compressor output pressure and compressor output flow.

5. A control system for a turbine driven compressor according to claim 1 further including a valve operable in response to compressor output pressure to regulate the flow of motive fluid to the turbine.

6. A control system for a turbine driven compressor according to claim 1 further including:

a control line in communication with said dump valve for receiving regulated motive fluid, high pressure motive fluid maintaining said dump valve closed, low pressure motive fluid allowing said dump valve to open, and a restrictive orifice in said control line to restrict flow of motive fluid to said system dump valve.

References Cited

UNITED STATES PATENTS

| | | | |
|---|---|---|---|
| 1,210,030 | 12/1916 | Baumann | 230—114 |
| 2,478,423 | 8/1949 | Ponomareff et al. | 230—115 |
| 2,490,188 | 12/1949 | Ziebolz | 230—115 |
| 3,167,945 | 2/1965 | Le May et al. | 230—115 |

HENRY F. RADUAZO, *Primary Examiner.*